Patented Oct. 6, 1953

2,654,765

UNITED STATES PATENT OFFICE 2,654,765

STEROID HALONITRILES

Frederick W. Heyl and Milton E. Herr, Kalamazoo, Mich., assignors to The Upjohn Company, Kalamazoo, Mich., a corporation of Michigan No Drawing. Application February 23, 1950, Serial No. 145,894

9 Claims. (Cl. 260—397.5)

This invention relates to a 3-substituted-22-cyano-22-halo-bisnor-5-cholenes wherein the 3-substituent is convertible to a hydroxyl group, and to their production.

The compounds of the present invention are usually crystalline solids soluble in methanol, ethanol, acetone, and the like, but insoluble in water and the paraffin and halogenated paraffin hydrocarbon solvents and may be represented graphically by the following formula:

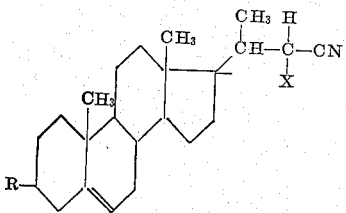

wherein R represents a group convertible to a hydroxyl group and X is a halogen of the group consisting of chlorine and bromine. Suitable groups convertible to a hydroxyl group according to this invention include acyloxy radicals of monocarboxylic organic acids having up to and including eleven carbon atoms and hydrocarbonoxy radicals in which the hydrocarbon portion contains from one to nineteen carbon atoms, inclusive.

These compounds can be prepared by heating a steroid-aldehyde cyanhydrin of the formula:

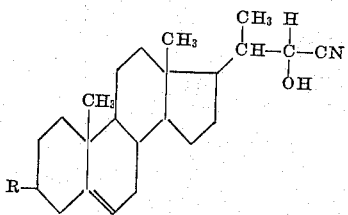

wherein R has the value previously given, with a phosphorus oxyhalide from the group consisting of phosphorus oxychloride and phosphorus oxybromide in a solvent, and preferably in the presence of a coal tar base.

The starting compounds of the present invention are obtainable from the corresponding aldehydes by reaction of their bisulfite addition products with an alkali-metal cyanide in the presence of an inert solvent, such as aqueous acetone or aqueous dioxane, according to the procedure described in J. Am. Chem. Soc. 71, 3317 (1948) by Levin et al.

We preferably conduct the conversion of a steroid-aldehyde cyanhydrin to a steroid-alpha-halonitrile in the presence of a diluent, such as a tertiary amine, e. g., pyridine, quinoline, lutidine, and the like, and it can be conducted in the absence of a base, in which case an inert solvent, such as toluene, or the like can be used as a diluent.

A reaction temperature between about thirty degrees and about 140 degrees centigrade is suitable, the preferred temperature being between about ninety and 120 degrees centigrade. The time of reaction is dependent upon the temperature used, but ordinarily ten to thirty minutes is satisfactory when the reaction is conducted in the preferred temperature range.

At least one molar equivalent, and preferably a four to eight mole excess of phosphorus oxyhalide is used in the process of the present invention. Smaller amounts of phosphorus oxyhalide increase the time of reaction unduly while greater amounts offer no advantage.

As previously mentioned, the substituent in the 3 position is a group convertible to a hydroxyl group, preferably an acyloxy radical, an alkoxy radical, or an aralkoxy radical. Among the alkoxy radicals which may be employed are methoxy, ethoxy, isopropoxy, tertiary butoxy, cyclohexyloxy, and the like. Aralkoxy radicals such as benzyloxy, triphenylmethoxy, and the like, and acyloxy radicals such as formoxy, acetoxy, propionoxy, butyroxy, isobutyroxy, cyclohexanecarbonoxy, benzoxy, alpha-naphthoyloxy, phenylacetoxy, and the like, may also be used.

Although the starting materials containing the previously mentioned 3-substituents are equally operable in the method of the present invention, for matters of convenience and economy the lower alkoxy and acyloxy compounds, and in particular the methoxy and the acetoxy compounds are preferred.

Among the halonitriles which can thus be prepared and which are within the scope of this invention are: 3-formoxy-22-bromo-22-cyano-bisnor-5-cholene, 3 - acetoxy - 22 - chloro-22-cyano-bisnor-5-cholene, 3-propionoxy-22-bromo-22-cyano-bisnor - 5 - cholene, 3-isobutyroxy-22-chloro-22-cyano-bisnor - 5 - cholene, 3-tertiary-enanthoxy-22-bromo-22-cyano-bisnor-5-cholene, 3 - cyclohexanecarbonoxy - 22 - chloro-22-cyano-bisnor - 5 - cholene, 3 - benzoxy - 22 - bromo-22-cyano-bisnor - 5 - cholene, 3 - phenylacetoxy-22-chloro - 22 - cyano-bisnor - 5 - cholene, 3-ortho-methylbenzoxy-22-bromo - 22 - cyano-bisnor-5-cholene, 3-para-methylbenzoxy - 22 - chloro-22- cyano-bisnor-5-cholene, 3-alpha-naphthoyloxy-22-bromo-22-cyano-bisnor-5-cholene, 3 - methoxy-22-chloro-22-cyano-bisnor-5-cholene, 3-isopropoxy-22-bromo - 22 - cyano-bisnor-5-cholene, 3-iso-octyloxy-22-chloro - 22 - cyano - bisnor-5-cholene, 3-cyclohexyloxy - 22 - bromo-22-cyano-bisnor-5-cholene, 3 - benzyloxy - 22 - chloro-22-cyano-bisnor-5-cholene, and the like.

The following examples which show one method by which the compounds of the invention may be prepared are given by way of illustration only, and are not to be construed as limiting.

*Preparation 1.—3(beta)-acetoxy-bisnor-5-cholen-22-al cyanhydrin*

A mixture of 0.5 gram of 3(beta)-acetoxy-bisnor-5-cholen-22-al, 1.5 milliliters of dioxane, and three milliliters of forty percent aqueous sodium bisulfite was stirred at room temperature for thirty minutes, 0.5 gram of potassium cyanide added, and the mixture heated on a steam bath to about ninety degrees centigrade for five minutes. The resulting solution was allowed to stand for thirty minutes and poured into fifty milliliters of water. A resulting gummy precipitate was separated by decantation and crystallized from aqueous acetic acid. There was thus obtained 0.48 gram of 3(beta)-acetoxy-bisnor-5-cholen-22-al cyanhydrin which melted at 170–173 degrees centigrade.

In a manner essentially as described, 3-formoxy-bisnor-5-cholen - 22 - al cyanhydrin, 3-isobutyroxy-bisnor-5-cholen-22-al cyanhydrin, 3-benzoxy-bisnor-5-cholen-22-al cyanhydrin, 3-ortho-methylbenzoxy - bisnor - 5 - cholen-22-al cyanhydrin and 3-alpha-naphthoyloxy-bisnor-5-cholen-22-al cyanhydrin can also be prepared.

*Preparation 2.—3-methoxy-bisnor-5-cholen-22-al cyanhydrin*

In a manner essentially as described in Preparation 1, 3-methoxy-bisnor-5-cholen-22-al cyanhydrin, melting at 200 to 205 degrees centigrade was prepared from 3-methoxy-bisnor-5-cholen-22-al.

In a like manner, 3-propoxy-bisnor-5-cholen-22-al cyanhydrin, 3-isobutoxy-bisnor-5-cholen-22 - al cyanhydrin, 3 - cyclohexyloxy-bisnor-5-cholen-22-al cyanhydrin, and 3-benxyloxy-bisnor-5-cholen-22-al cyanhydrin can also be prepared.

*Example 1.—3-methoxy-22-chloro-22-cyano-bisnor-5-cholene*

A solution of 0.3 gram of 3-methoxy-bisnor-5-cholen-22-al cyanhydrin and 0.6 milliliter of phosphorus oxychloride in four milliliters of lutidine was heated under reflux for ten minutes, poured into a mixture of ten grams of ice and ten milliliters of concentrated hydrochloric acid, and extracted five times with equal volumes of ether. The organic extracts were combined, washed with an equal volume of five percent sodium bicarbonate solution, water, and dried. The solvent was removed by distillation and the residue crystallized from dilute acetone and 95 percent ethanol to obtain 0.29 gram of 3-methoxy-22-chloro-22-cyano-bisnor-5-cholene which melted at 169 to 171 degrees centigrade.

In a manner essentially as described, 3-n-propoxy-22-chloro - 22 - cyano-bisnor-5-cholene, 3 - isobutoxy - 22 - bromo - 22 - cyano-bisnor-5-cholene, 3-cyclohexyloxy - 22 - bromo-22-cyano-bisnor-5-cholene and 3-benzyloxy-22-chloro-22-cyano-bisnor-5-cholene can be prepared.

*Example 2.—3(beta)-acetoxy-22-chloro-22-cyano-bisnor-5-cholene*

A solution of 0.25 gram of 3(beta)-acetoxy-bisnor-5-cholen-22-al cyanhydrin and 0.5 milliliter of phosphorus oxychloride in three milliliters of lutidine was heated under reflux for ten minutes, poured into a mixture of ten grams of ice and ten milliliters of concentrated hydrochloric acid and extracted three times with equal volumes of ether. The organic extracts were combined, washed with equal volumes of five percent sodium bicarbonate solution, water, and dried. Upon removal of the solvent by distillation and crystallization of the residue from methanol, 0.25 gram of 3(beta)-acetoxy-22-chloro-22-cyano-bisnor-5-cholene which melted at 187 to 188 degrees centigrade, was obtained.

*Example 3.—3(beta)-acetoxy-22-bromo-22-cyano-bisnor-5-cholene*

A solution of one gram of 3(beta)-acetoxy-bisnor-5-cholen-22-al cyanhydrin in ten milliliters of dry pyridine was added at a substantially uniform rate over a period of ten minutes to a stirred solution of one gram of phosphorus oxybromide in ten milliliters of dry pyridine, heated under reflux for twenty minutes, poured into a mixture of fifteen grams of ice and fifteen milliliters of concentrated hydrochloric acid, and extracted five times with equal volumes of ether. The organic extract was washed with an equal volume of five percent sodium bicarbonate solution, water, and dried. Upon removal of the solvent by distillation and crystallization of the residue, there was obtained 1.04 gram of 3(beta)-acetoxy-22-bromo - 22 - cyano-bisnor-5-cholene which melted at 187–188 degrees centigrade.

In a manner essentially as described, 3-formoxy-22-bromo-22-cyano-bisnor-5-cholene, 3-isobutyroxy-22-chloro-22-cyano - bisnor-5-cholene, 3 - phenyl-acetoxy-22-bromo-22-cyano-bisnor-5-cholene, 3-benzoxy-22-chloro-22-cyano-bisnor-5-cholene, and 3-(alpha)-naphthoyloxy-22-bromo-22-cyano-bisnor-5-cholene can be prepared.

It is to be understood that the present invention is not to be construed as limited to the exact details of preparation or exact compounds shown or described, as obvious modifications and equivalents will be apparent to one skilled in the art, and the invention is, therefore, to be limited only as defined by the appended claims.

We claim:

1. A member of the group of compounds represented by the formula:

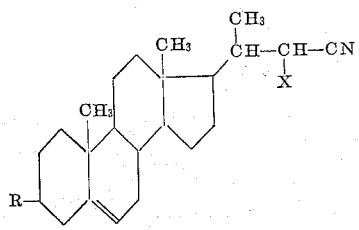

wherein R is a radical of the group consisting of acyloxy radicals of unsubstituted monocarboxylic organic acids having up to and including eleven carbon atoms and hydrocarbonoxy radicals in which the hydrocarbon portion contains from one to nineteen carbon atoms, inclusive and X is from the group consisting of chlorine and bromine.

2. A member of the group of compounds represented by the formula:

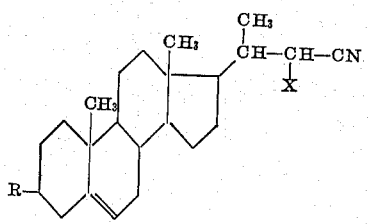

wherein R is an acyloxy radical of an unsubstituted monocarboxylic organic acid having up to and including eleven carbon atoms, and wherein X is chlorine.

3. A member of the group of compounds represented by the formula:

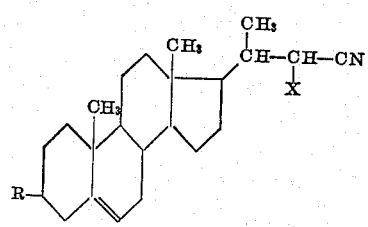

wherein R is a hydrocarbonoxy radical in which the hydrocarbon portion contains from one to nineteen carbon atoms, inclusive, and wherein X is chlorine.

4. A member of the group of compounds represented by the formula:

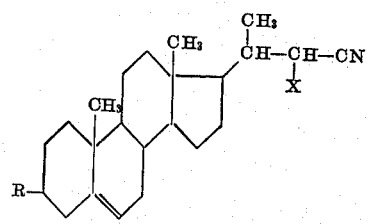

wherein R is an acyloxy radical of an unsubstituted monocarboxylic organic acid having up to and including eleven carbon atoms and wherein X is bromine.

5. A member of the group of compounds represented by the formula:

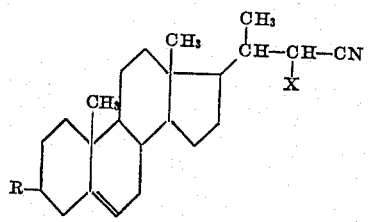

wherein R is a hydrocarbonoxy radical in which the hydrocarbon portion contains from one to nineteen carbon atoms, inclusive, and wherein X is bromine.

6. 3-acetoxy-22-chloro - 22 - cyano-bisnor-5-cholene.

7. 3-acetoxy-22-bromo - 22 - cyano-bisnor-5-cholene.

8. 3-methoxy-22-chloro - 22 - cyano-bisnor-5-cholene.

9. A process for the production of a 3-substituted steroid-halonitrile graphically represented by the formula:

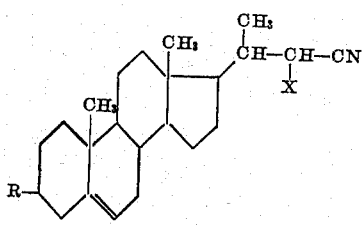

wherein R is a group convertible to a hydroxyl group and X is from the group consisting of chlorine and bromine comprising: heating a 3-substituted steroid-aldehyde cyanhydrin graphically represented by the formula:

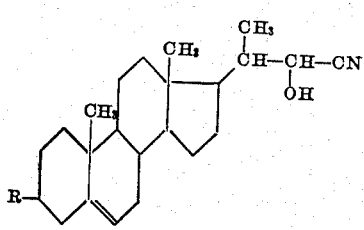

wherein R has the value previously given with a phosphorus oxyhalide from the group consisting of phosphorus oxybromide and phosphorus oxychloride to between about thirty to 140 degrees centigrade and isolating the product thus formed.

FREDERICK W. HEYL.
MILTON E. HERR.

No references cited.